(12) United States Patent
Mayaud

(10) Patent No.: US 8,496,567 B2
(45) Date of Patent: Jul. 30, 2013

(54) METHOD AND DEVICE FOR ADJUSTING THE DISTANCE BETWEEN TWO MEMBERS, AT LEAST ONE OF WHICH IS MOBILE, AND SWIMMING HARNESS USING THE SAME

(76) Inventor: Christophe Mayaud, Sorgues (FR)

( * ) Notice: Subject to any disclaimer, the term of this patent is extended or adjusted under 35 U.S.C. 154(b) by 479 days.

(21) Appl. No.: 12/663,299

(22) PCT Filed: May 30, 2008

(86) PCT No.: PCT/FR2008/000738
§ 371 (c)(1),
(2), (4) Date: Apr. 27, 2010

(87) PCT Pub. No.: WO2009/004170
PCT Pub. Date: Jan. 8, 2009

(65) Prior Publication Data
US 2010/0204019 A1    Aug. 12, 2010

(30) Foreign Application Priority Data
Jun. 7, 2007  (FR) ...................... 07 04075

(51) Int. Cl.
*A63B 21/00* (2006.01)
(52) U.S. Cl.
USPC ........................... 482/124; 482/148; 139/388
(58) Field of Classification Search
USPC .................... 482/121–129, 105, 13
See application file for complete search history.

(56) References Cited

U.S. PATENT DOCUMENTS

| | | | | |
|---|---|---|---|---|
| 2,117,322 A * | 5/1938 | Hillman | ................ | 267/69 |
| 3,353,817 A * | 11/1967 | Bollinger | ................ | 267/69 |
| 3,519,269 A * | 7/1970 | Howlett et al. | ................ | 482/120 |
| 4,258,608 A * | 3/1981 | Brown | ................ | 87/6 |
| 4,524,711 A * | 6/1985 | Ashrow | ................ | 482/55 |
| 5,083,522 A * | 1/1992 | Ashrow | ................ | 114/215 |
| 5,205,803 A * | 4/1993 | Zemitis | ................ | 482/121 |
| 5,229,178 A * | 7/1993 | Zemitis | ................ | 428/37 |
| RE34,351 E * | 8/1993 | Lacey | ................ | 119/776 |
| 5,267,906 A * | 12/1993 | Kitchen et al. | ................ | 472/118 |
| 5,472,394 A * | 12/1995 | Michaelson | ................ | 482/74 |
| 5,549,532 A * | 8/1996 | Kropp | ................ | 482/126 |
| 5,649,699 A * | 7/1997 | Todoroff | ................ | 473/425 |
| 5,807,218 A * | 9/1998 | Nagatomo | ................ | 482/124 |
| 5,951,443 A * | 9/1999 | Askins | ................ | 482/74 |
| 6,299,040 B1 * | 10/2001 | Matias | ................ | 224/254 |
| 6,368,258 B1 * | 4/2002 | Emlaw | ................ | 482/124 |
| 6,390,009 B2 * | 5/2002 | Brown et al. | ................ | 114/230.24 |
| 6,776,317 B1 * | 8/2004 | Parker | ................ | 224/251 |
| 6,840,894 B2 * | 1/2005 | Lerner | ................ | 482/124 |
| 7,147,590 B2 * | 12/2006 | Toven | ................ | 482/51 |
| 7,185,598 B1 * | 3/2007 | Lan et al. | ................ | 114/215 |
| 7,273,444 B2 * | 9/2007 | Chang | ................ | 482/55 |
| 7,361,127 B2 * | 4/2008 | Tremayne | ................ | 482/130 |
| 7,608,015 B2 * | 10/2009 | Radow | ................ | 482/4 |
| 7,699,761 B1 * | 4/2010 | Dieter et al. | ................ | 482/124 |
| 8,209,899 B2 * | 7/2012 | Klein | ................ | 43/44.98 |

(Continued)

*Primary Examiner* — Stephen Crow
(74) *Attorney, Agent, or Firm* — Egbert Law Offices, PLLC

(57) ABSTRACT

An elastic link for adjusting the distance between two members, at least one of which is mobile, is characterized in that it includes at least two elastic yarns each attached through one of the opposite ends thereof to two points distant from each other of an intermediate portion of a strap located between the extreme portions of the latter, under conditions such that when a tensile force is applied on said strap, the first elastic yarn is stretched first, the second elastic yarn being then stretched based on the magnitude of the applied tensile force.

12 Claims, 6 Drawing Sheets

U.S. PATENT DOCUMENTS

| | | | |
|---|---|---|---|
| 2003/0130098 A1* | 7/2003 | Marco | 482/124 |
| 2003/0220160 A1* | 11/2003 | Clark et al. | 473/446 |
| 2005/0217748 A1* | 10/2005 | Ikegami | 139/388 |
| 2005/0282689 A1* | 12/2005 | Weinstein | 482/124 |
| 2006/0183609 A1* | 8/2006 | Flynn | 482/124 |
| 2007/0142185 A1* | 6/2007 | Woodman et al. | 482/69 |
| 2008/0009398 A1* | 1/2008 | Grisdale | 482/124 |
| 2009/0098945 A1* | 4/2009 | George | 473/213 |
| 2009/0149303 A1* | 6/2009 | Meisterling | 482/124 |
| 2009/0291780 A1* | 11/2009 | Gutierrez | 473/426 |
| 2010/0062881 A1* | 3/2010 | Horkan | 473/439 |
| 2010/0216613 A1* | 8/2010 | Pacini | 482/122 |
| 2011/0207585 A1* | 8/2011 | Burns | 482/124 |

* cited by examiner

METHOD AND DEVICE FOR ADJUSTING THE DISTANCE BETWEEN TWO MEMBERS, AT LEAST ONE OF WHICH IS MOBILE, AND SWIMMING HARNESS USING THE SAME

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention concerns a method for adjusting the distance between two elements, at least one of which is mobile. It also concerns a device permitting this adjustment, this device comprising an elastic link with an exponentially progressive resistivity to elongation, depending on the tensile force applied to it. The invention also concerns a swimming harness applying this method and this device.

2. Description of Related Art Including Information Disclosed Under 37 CFR 1.97 and 37 CFR 1.98

It is common practice to use elastic cables or cords composed of several rubber threads placed side by side under a sheath, for various uses such as, for example, fastening of packages or luggage on a support, launching of gliders, braking of airplanes at landing [arrestor wires on aircraft carriers], etc.

The elastic threads of the bundle constituting these cables or multi-stranded cords are all of the same length and are fastened at their opposing ends to a buckle or some other fastening device, so that their resistance to elongation is uniform up to the point where they approach their stretch limit.

In certain applications, this resistance to uniform stretch constitutes a drawback. Such a drawback is experienced, in particular, when the elastic band is used as a means for retaining a swimmer swimming in place, for instance in a pool of small dimensions (see U.S. Pat. No. 5,083,522 and DE-197 41 309). In this situation, the swimmer is wearing a harness and is tethered to a rim of the pool or to a fixed point near this rim, by means of a fully (DE-197 41 309) or partially (U.S. Pat. No. 5,083,522) elastic tether which allows to keep him at a distance from the opposite rim of the pool, for example in the middle part or essentially in the middle part of the pool, so that he may swim without having to change direction incessantly for the desired duration.

In this case, the drawback resulting from the uniform elongation of the elastic strands forming the retaining straps, or the elastic portion of these, is that one is obliged to provide a set of several straps with different stretch capabilities, so that each swimmer will be able to select a specific strap that is suitable to his age, or to his level of swimming, or to his physical strength.

As a matter of fact, an elastic strap with a low capacity of elastic elongation, i.e., of high resistance to stretching, will not permit a young swimmer or a beginner to move forward, so that they will not experience the sensation of a normal swim, whereas an elastic strap with a greater degree of stretch, i.e., with low resistance to stretching, will not keep a good swimmer in the middle part of the pool.

One is also familiar (DE-25 02 925) with energy-absorbing devices applicable to the safety belts in automobiles and consisting of a number of elastic belts of different lengths which are fastened at two fixed points in the interior of the vehicles. These energy-absorbing devices operate on the principle of a system featuring characteristics of progressive elongation depending on the severity of the shock, but they are not designed to adjust a variable distance between two points.

BRIEF SUMMARY OF THE INVENTION

The present invention proposes a simple and efficacious solution to the problem of adjusting the distance between two elements at least one of which is mobile and especially to the afore-mentioned drawbacks of swimming harnesses featuring an elastic link with uniform resistance to stretching.

According to the invention, this objective has been achieved through a noteworthy method in that two points or elements, separated by a variable distance and at least one of which is mobile, are connected by means of an elastic link comprising a number of elastic strands that are so arranged that said elastic link generates a progressive resistance to stretching when one of said elements connected in this manner is subjected to a tensile force working to distance it from the other.

The elastic link according to the invention includes a number of elastic strands, preferably covered with an extensible sheath, for example composed of at least one braided sleeving, this elastic link distinguishing itself by an arrangement of said elastic strands, through which said stretchable link becomes capable of progressive resistance to stretching.

According to a mode of execution that is very advantageous and easy to implement, the extensible link according to the invention includes at least two elastic strands that are each fastened, through the intermediary of their opposing ends, at two points distant from each other, of an intermediate portion of a strap, comprised between the extreme portions of the latter, under such conditions that when a tensile force is applied on said strap, a first elastic strand is stretched first, then the second elastic strand is stretched, depending on the measure of tensile force applied.

According to a preferred mode of execution, the stretchable link according to the invention comprises a number of elastic strands of identical or essentially identical length which are each attached, through the intermediary of their opposing ends, at two points distant from each other, on an intermediary portion of a strap, comprised between the extreme portions of the latter, under such conditions that when a tensile force is applied to said strap, a first strand is stretched first, then a second and then a third and so on, depending on the measure of tensile force applied.

Advantageously, the strap is made of a textile, water-repellent material.

According to an advantageous mode of execution, the different elastic strands are fastened, through the intermediary of their opposing ends, on the one hand, in a common location of the strap, and, on the other hand, in points apart from each other and at different distances from their common point of fastening.

According to an interesting mode of realization, the elastic strands are grouped two by two; each pair of strands including a circular elastic link fitted in two spaced flattened sleeves said strap is equipped with.

According to another mode of execution, the elastic strands of the elastic bundle are of identical or approximately identical lengths.

According to another mode of execution, the elastic strands of the elastic bundle have identical characteristics.

By virtue of the aforementioned characteristic arrangements, an elastic link is obtained that has an exponentially variable resistance to stretching, for example from 0 to 30 kgf, which, in the application that is interesting for in-place-swimming, acts like a shock absorber which opposes itself progressively to the advance of the swimmer and keeps him/her on a limited track, whatever the developed force might be, which allows him/her to remain in the middle part of the pool.

Of course, this elastic link with the capability of progressive resistance to stretching can find a great variety of interesting applications such as for example:

braking of airplanes at landing;
bungee jumping;
connection between two moving persons (riding in pairs on bicycles, roller skates, skis . . . );
connection between an animal and a person (dog leash, harness for sled dogs or analog hitching);
rowing sports in pools (paddling, kayak, etc.);
connection between a person and an object (attachment strap of a surf board to a surfer, link connecting a water skier or a swimmer to a boat);
towing of vehicles;
stabilization of outdoor sports (running or walking in place) etc.

BRIEF DESCRIPTION OF THE DRAWINGS

The above goals, characteristics and advantages and still others will become clearer by the following description and the attached drawings in which.

Figure 1:
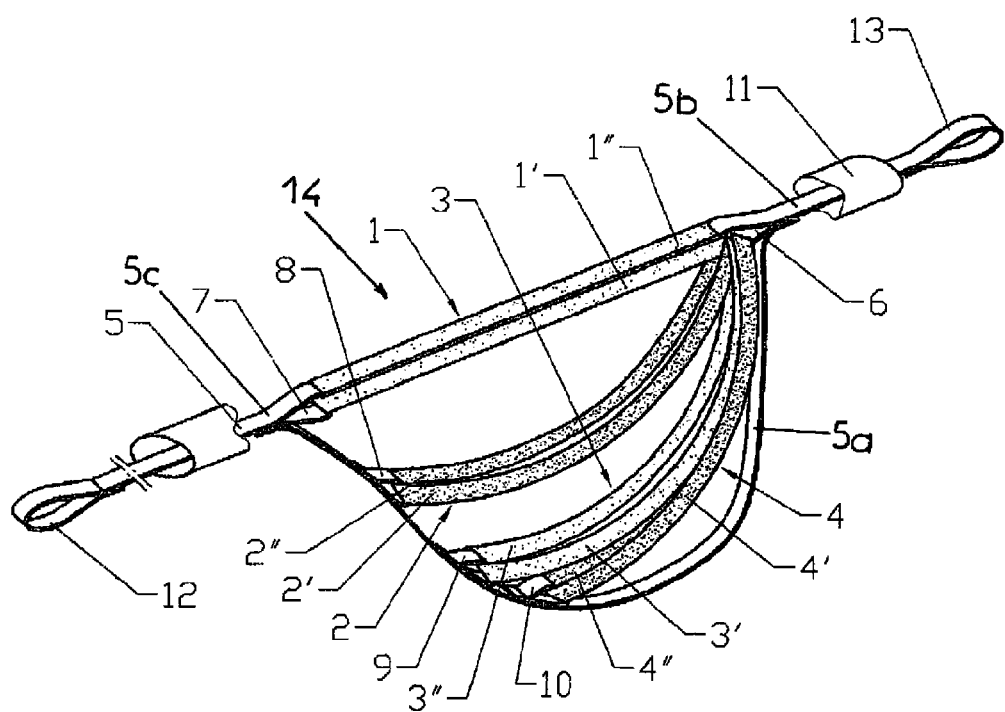
FIG. 1 is perspective view, with partial removal, of an example of execution of the elastic link with progressive stretching resistance capability according to the invention.
Figure 2:
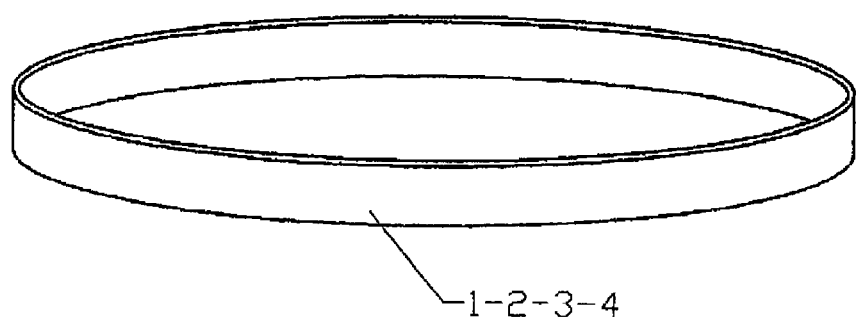
FIG. 2 is a perspective view of a double strand or a circular strand forming one of the elastic components of this link.
Figure 3:
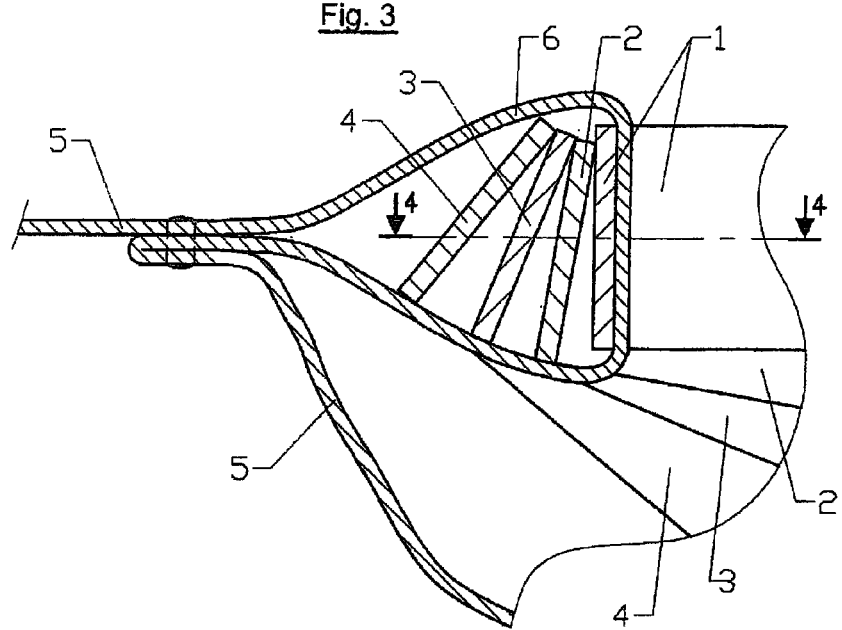
FIG. 3 is a schematic view in a longitudinal section and at an enlarged scale, showing the fastening of all the circular elastic strands on a common sleeve of the strap.
Figure 4:
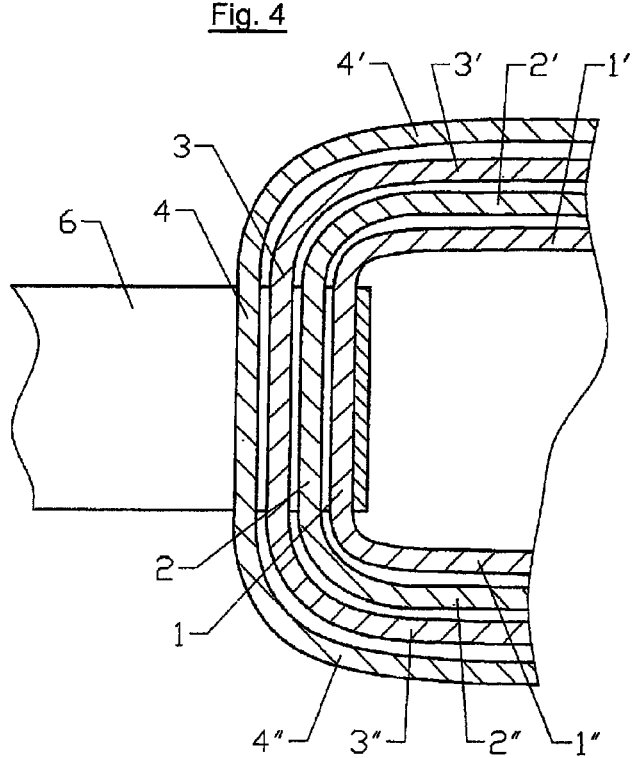
FIG. 4 is a sectional view along line 4-4 of FIG. 3.
Figure 5:
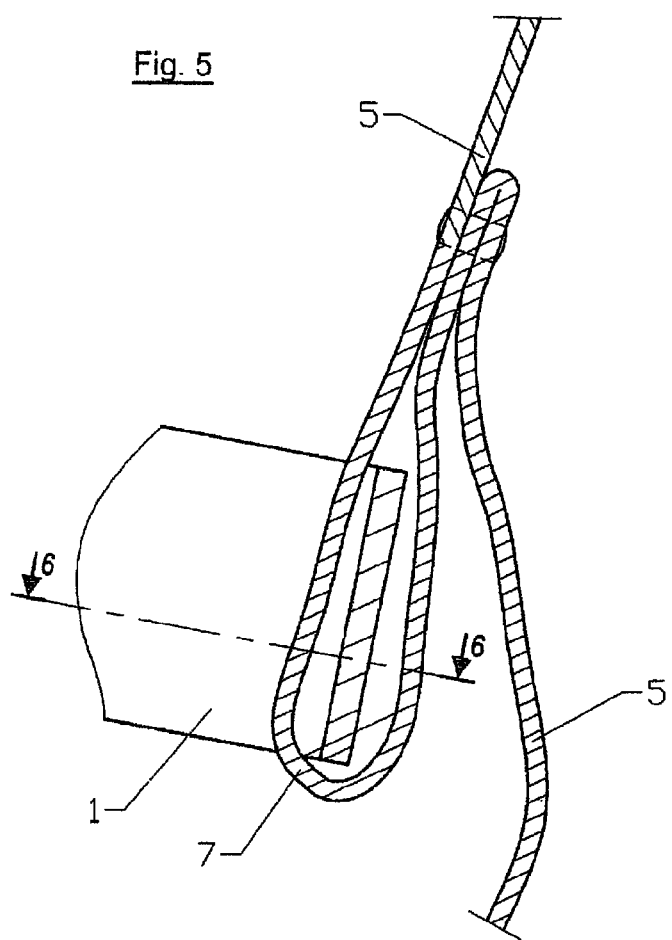
FIG. 5 is a schematic view of a longitudinal section, showing the individual fastening of one of the circular elastic strands on a specific sleeve, away from the common sleeve of the strap.
Figure 6:
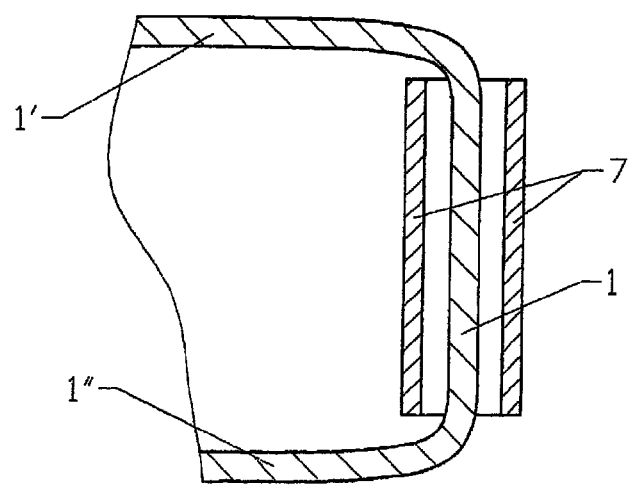
FIG. 6 is a sectional view along line 6-6 of FIG. 5.

Reference is made to said drawings to describe an interesting, although by no means limiting, example of implementation of the method and production of an elastic link with the capability of progressive resistance to elongation according to the invention, as well as an advantageous application of same.

DETAILED DESCRIPTION OF THE INVENTION

The method of the invention is primarily noteworthy in that one connects together two points or elements 15, 16, separated by a variable distance (FIG. 12) by means of an elastic link 14, comprising, at least in its intermediary portion, of at least two or more than two elastic strands arranged in such a manner that said elastic link generates a progressive resistance to stretching when one of said elements (15) connected in this manner is subjected to a force tending to move it away from the other (16).

The elastic link according to the invention comprising a number of elastic strands 1, 2, 3, and 4, and it is primarily noteworthy because of an arrangement of this bundle of strands according to which said stretchable link has a capability of progressive resistance to stretching.

According to a very advantageous method of execution, the extensible link according to the invention comprises at least two elastic strands 1, 2, 3, and 4, which are fastened, each through the intermediary of its opposing ends, at two points distant from each other, of an intermediary portion of a strap included between the extreme portions of the latter, under such conditions that when tension is exerted on said strap, a first elastic strand 1 is stretched first, then the second elastic strand 2 is being stretched, depending on the tensile force applied.

According to an advantageous method of execution, the elastic strands 1, 2, 3, and 4 are of the same or approximately the same length and are attached, each through the intermediary of its opposing ends, at two points distant from each other 6-7, 6-8, 6-9, and 6-10, on an intermediary portion 5*a* of a strap 5, included between the extreme portions 5*b*, 5*c* of the latter, under such conditions that when a tensile force is exerted on said strap, a first strand 1 is stretched first, then a second strand 2, then a third strand 3, etc., depending on the tensile force applied to the ends of said strap. This strap 5 is preferably not elastic. It comprises, for example, advantageously, of a flat non-extensible band formed by braided, water-repellent synthetic threads.

Advantageously, the elastic strands are paired or grouped two by two 1'-1", 2'-2", 3'-3", 4'-4" and each pair of strands 1, 2, 3, and 4 comprises a circular elastic link or of an endless elastic link.

According to a characteristic arrangement of the invention, the different elastic strands 1, 2, 3, and 4 are fastened, through the intermediary of their opposite ends, on the one hand, in a common location 6 of the strap 5 and, on the other hand, in points 7, 8, 9, 10, spaced from each other of said strap, and differently spaced from their common point of connection 6.

Advantageously, the fastening locations 6, 7, 8, 9 and 10 of the strap 5 are formed by connectors said strap is equipped with, over a portion of its length, each circular elastic link 1, 2, 3 and 4 being engaged, on the one hand, in a common connector 6, and, on the other hand, individually, in one of the connectors that are spaced from each other 7, 8, 9, 10 and placed at different distances from said common connector 6.

In other words, the elastic loops 1, 2, 3 and 4 are attached to the strap 5 through the intermediary of the same connector 6, and thus in one single location of said strap, whereas at the other end, the individual points of attachment of said elastic loops are distinct and succeed each other along the strap.

According to the example shown, the successive gaps between the individual points of attachment 7, 8, 9 and 10 of the circular elastic links 1, 2, 3 and 4 evolve along the strap 5, growing longer as one approaches the end of said strap 5.

According to another characteristic arrangement, the elastic strands 1, 2, 3 and 4 constituting the elastic bundle, are of identical or approximately identical lengths.

Advantageously, the elastic strands 1, 2, 3 and 4 are constituted by flat stripes of elastic matter, for example by flat stripes of natural or synthetic rubber.

On the other hand, in a very interesting manner, they present identical characteristics (material, length, width or diameter) thereby facilitating the manufacture and affecting favorably the cost.

Preferably, the elastic bundle 1, 2, 3 and 4, is lodged in a sheath or supple sleeve which may advantageously comprise an extensible sleeve 11, partially shown in FIG. 1 and, for example, comprises a tubular tress of water-repellent synthetic threads.

The opposing ends of the strap 5 are provided with fasteners 12 and 13 so it can be fastened at two distant points which one wants to connect elastically with a possibility of progressive resistance to stretching.

For example, in the application more specifically meant for equipment intended for in-place swimming, one of the ends of the strap 5 may be equipped with a connector or loop 12 allowing its fastening with a possibility of sliding or not on an element of a body harness, whereas the other end of said strap may be equipped with a loop 13 or other attaching device permitting, for example, its attachment to a fixed element located on the rim of a swimming-pool or to a post placed rigidly at the outside and in proximity of said rim.

One can well understand the functioning of the elastic link of strap with the capability of variable resistance to elongation described above.

Figure 12:
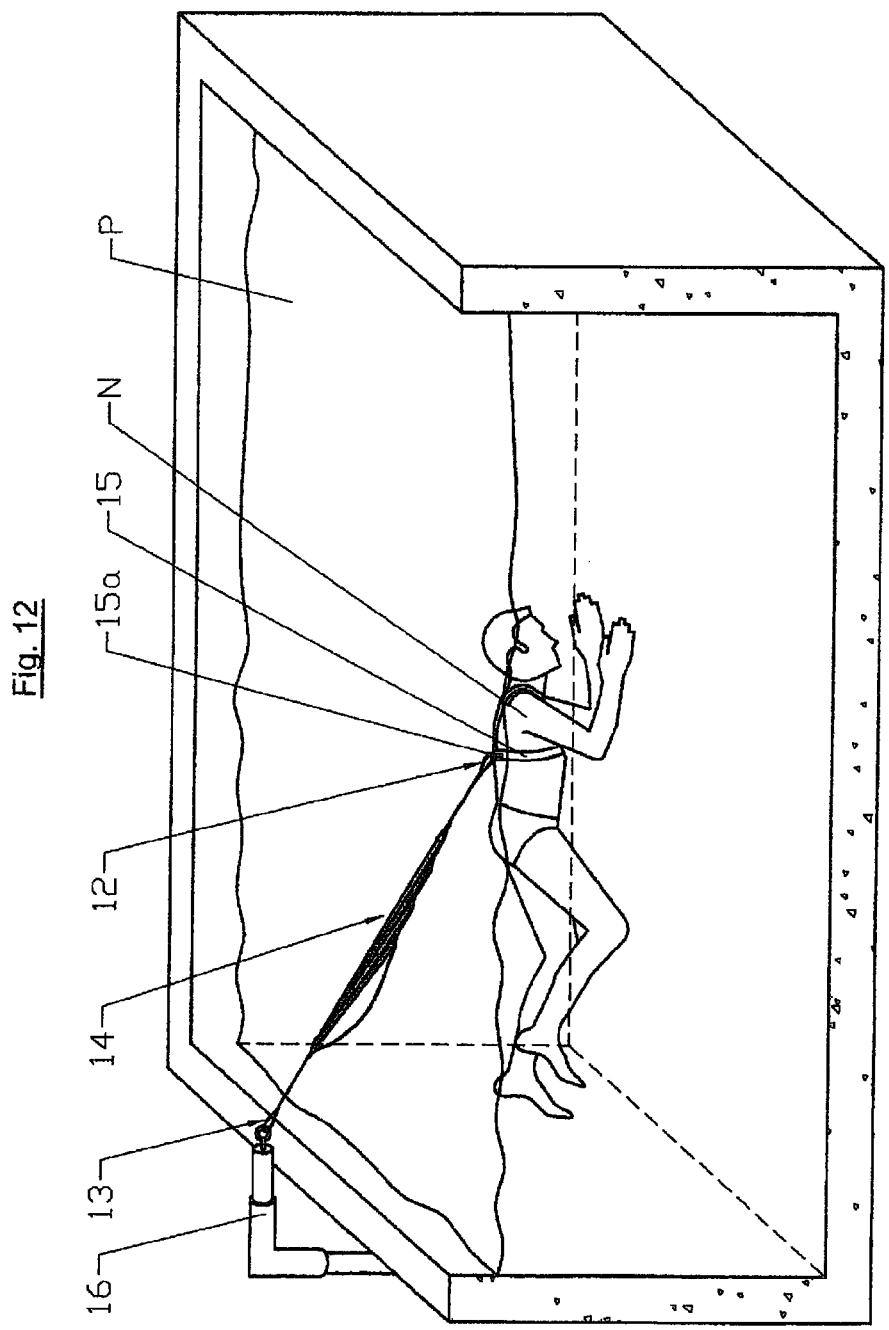
FIG. 12 is a perspective view illustrating a very advantageous application of the invention to a swimming harness for in-place swimming.

When in use, in the cases of the advantageous application for in-place swimming, this link designated in its entirety by reference 14 in FIG. 12, is attached, on the one hand, by that one of its ends which is equipped with the connector or loop 12, to an element 15a of a harness worn by a swimmer N moving in the pool P, and, on the other hand, by its opposite end 13, to a mooring element comprising a fixed post 16 positioned at the outside and in proximity of one of the transversal rims of the pool.

Figure 7:
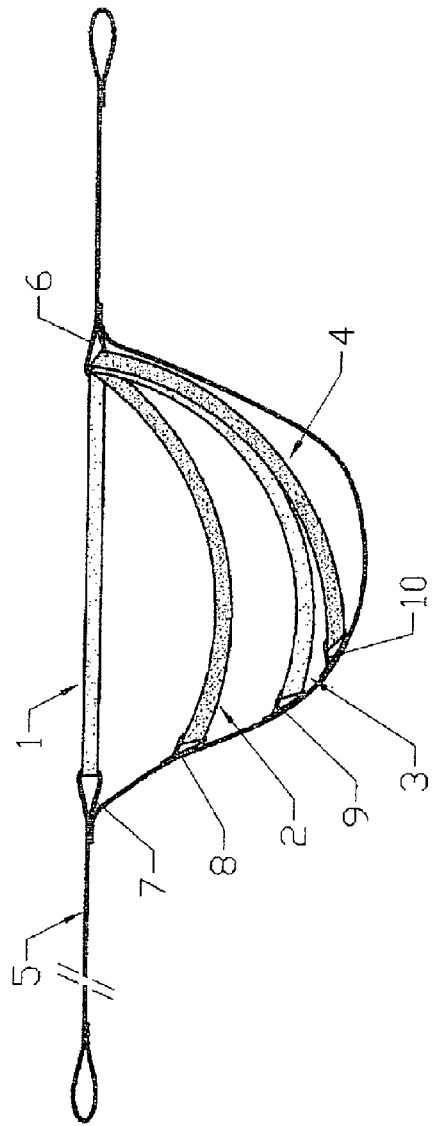
FIG. 7 is a front view showing the link in taut but not stretched position, the sheath enclosing all the elastic components of the stretchable link is not shown on this figure and the following four figures to make it easier to understand the invention.

FIG. 7 illustrates an initial situation according to which the elastic strand 1 whose individual point of attachment 7 is the farthest from the common point of attachment 6, is taut but not stretched, whereas the other strands 2, 3 and 4 are slack and 'floating'.

Figure 8:
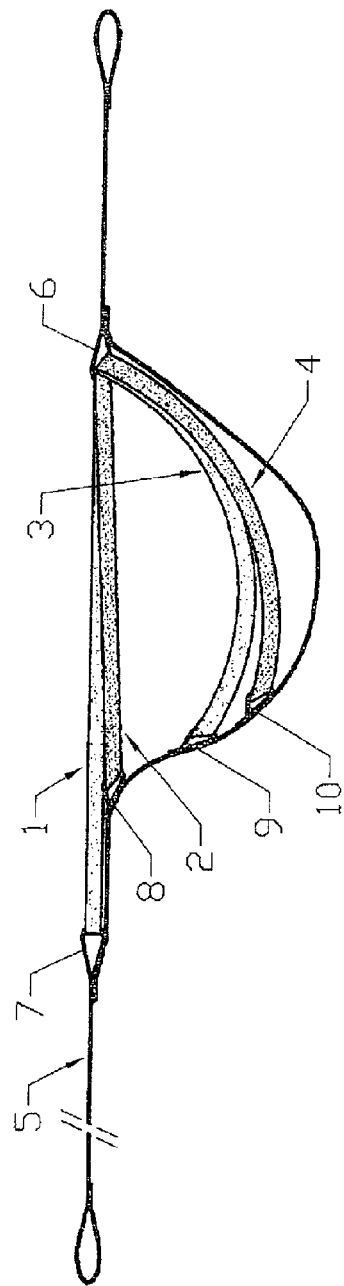
FIGS. 8 to 11 are front views that are analog to FIG. 7, showing the elastic link at different successive stages of stretching.

When a tensile force T1 of low value (for example between 0 and 6 kgf) is applied to the elastic link according to the invention, one obtains at first a stretch of the elastic strand 1 over a reduced length (for example between 0 to 40 cm), whereas the elastic strand 2 attached to the next individual fastening point 8 is taut but not stretched, and the other elastic strands 3 and 4 remain slack and 'floating' (FIG. 8).

Figure 9:
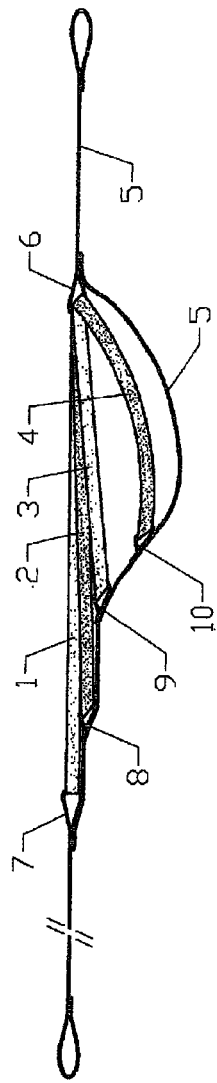

When the tensile force is increased to a determinate higher value T2 (for example from 6 to 13 kgf), the elastic strand 2 is stretched at the same time as the strand 1, so that the elastic link 14 finds itself equally stretched over an additional length (for example between 0 and 40 cm), whereas the elastic strand 3 attached to the next fastening point 9 is taut but not stretched and the other elastic strand 4 remains slack and 'floating' (FIG. 9). In this case, the value of elongation of the elastic link 14 corresponds to the value of total elongation of the elastic strand 1 (for example between 40 and 60 cm).

Figure 10:
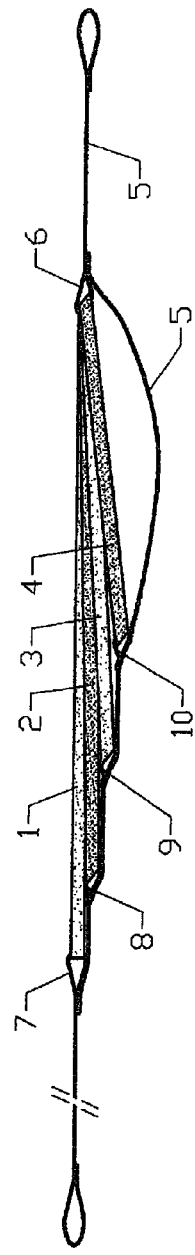

When an even greater tensile force T3 is applied (for example from 13 to 27 kgf) to the elastic link 14, the elastic strands 1 and 2 are stretched over an additional length (for example between 0 and 30 cm), whereas the elastic strand 3 is stretched over a same length and the elastic strand 4 is taut but not stretched (FIG. 10). In this case, the value of elongation of the elastic link 14 corresponds to the value of total stretch of the elastic strand 1 (for example between 40 and 90 cm).

Figure 11:
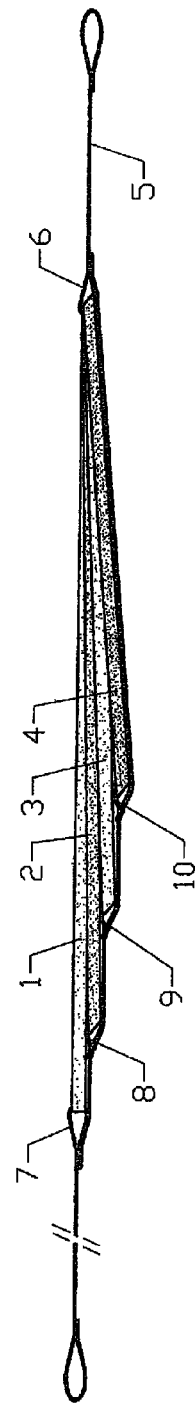

And so on, up to the stretch of the elastic strand whose individual point of attachment is closest to the common fastening point 6 (fastening point 10 of the elastic strand 4, according to the example shown in FIG. 11).

FIG. 11 shows a state of elongation of the elastic link 14 according to which all elastic strands 1, 2, 3, 4 are stretched, this elongation corresponding to the value of total stretch of the elastic strand 1 whose individual fastening point 7 is the farthest from the common fastening point 6. In this situation of maximum elongation, the strap 5 is itself taut and is opposed to any additional undesirable stretch of the elastic strands.

The advantages gained are an elongation which is considerably less for the same effort, which permits, in the application of the elastic link to in-place-swimming, to retain the swimmer at a short distance (for example, in the order of 80 cm) so as to keep him in the middle of the pool which may therefore be of reduced dimensions, as well as a much greater flexibility of usage which allows the swimmer not to feel 'tied up', as the response of the elastic link is proportional to his effort rather than being static or linear.

The invention concerns also a swimming harness for in-place swimming. This harness comprises primarily an actual harness comprising a strapping device to be placed around the body of a swimmer, and an elastic link 14 fastened, through the intermediary of one of its ends 13, in either a detachable manner or not, to an element 15a of said harness, and whose other end 12 is shaped so that it can be attached, either permanently or not, to a fixed mooring element 16. The swimming harness according to the invention is noteworthy in that said elastic link 14 comprising at least two or more than two elastic strands 1, 2, 3, 4, . . . , arranged so that said elastic link is provided with a capability of progressive resistance to elongation; this elastic link featuring one or several of the previously described characteristics.

I claim:

1. An elastic link apparatus for permitting an adjustment of a distance between a first element and a second element in which at least one of the elements is mobile, the elastic link apparatus comprising:
   a strap having a length dimension;
   a first elastic strand having one end connecting to a first location along said strap and another end connected to a second location along said strap, said first location being spaced from said second location by a first distance; and
   a second elastic strand having one end connected to a third location along said strap and another end connected to a fourth location along said strap, said third location being spaced from said fourth location by a distance less than the distance between said first location and said second location such that when tensile forces are applied to said strap said first elastic strand is stretched first and before the second elastic strand is stretched.

2. The elastic link apparatus of claim 1, further comprising:
   a third elastic strand having one end affixed to a fifth location on said strap and another end affixed to a sixth location on said strap, said fifth location being spaced by a distance from said sixth location that is less than the distance between said third location and said fourth location such that when tensile forces are applied to said strap said second elastic strand is stretched before said third elastic strand is stretched.

3. The elastic link apparatus of claim 1, said first and third locations being substantially the same location.

4. The elastic link apparatus of claim 1, said first elastic strand and said second elastic strand having identical characteristics.

5. The elastic link, apparatus of claim 1, said strap being non-elastic.

6. The elastic link apparatus of claim 1, each of said first elastic strand and said second elastic strand comprising a pair of strands received in a sleeve, said sleeve extending for at least a portion of the length of the pair of strands.

7. The elastic link apparatus of claim 1, said strap being formed of a water-repellant textile material.

8. The elastic link apparatus of claim 1, said first elastic strand and said second elastic strand having approximately identical lengths.

9. The elastic link, apparatus of claim 1, each of said first and second elastic strands being a flat band.

10. The elastic link apparatus of claim 1, each of said first and second elastic strands being covered by a flexible sheath.

11. The elastic link apparatus of claim 10, said flexible sheath being stretchable.

12. The elastic link apparatus of claim 1, said strap having a first end suitable for affixed to a body of a swimmer, and a strap having a second end suitable for affixing to a fixed mooring element.

* * * * *